Patented Dec. 17, 1935

2,024,797

UNITED STATES PATENT OFFICE 2,024,797

MORDANT TRISAZO-DYESTUFFS AND THEIR PRODUCTION

Ernst Hug, Neu-Allschwil, near Basel, and Max Müller, Basel, Switzerland, assignors to firm of "Durand & Huguenin S. A.", Basel, Switzerland No Drawing. Application July 21, 1933, Serial No. 681,666. In Germany August 24, 1932

7 Claims. (Cl. 260—72)

In U. S. Patent No. 1,663,950 are described red mordant-dyestuffs which are valuable in chrome printing; these dyestuffs are made by combining the diazo-compound of 3-amino-benzene-azo-salicylic acid or a homologue or substitution product thereof with an acidyl-peri-amino-naphthol-sulphonic acid. If in this combination there is used instead of an acidyl-peri-aminonaphthol-sulphonic acid a simple peri-aminonaphthol-sulphonic acid which is unsubstituted in the amino-group, there are obtained dyestuffs which are of considerably less interest, in particular dyestuffs which have a lower fastness to chlorine. It appears therefore that in the case of the dyestuffs of U. S. Patent No. 1,663,950 the acidyl-group, such as the acetyl-group, contributes to the fastness of the dyestuffs.

The present invention provides a further way of arriving in this field at fast mordant-dyestuffs, particularly dyestuffs fast to chlorine. For this purpose, instead of acidylating the amino-group of a peri-aminonaphthol-sulphonic acid, an azo-group is introduced into the ortho-position to this amino-group by combination with a diazo-compound in a weakly acid solution. The mono-azo-dyestuff so obtained is thereafter combined in an alkaline medium with a diazotized amino-azo-compound such as is used in the process of U. S. Patent No. 1,663,950.

According to the invention therefore valuable mordant trisazo-dyestuffs corresponding with the general formula:

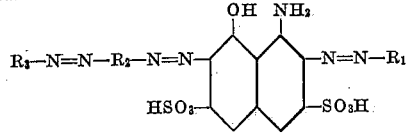

wherein $R_1$ represents a benzene nucleus, substituted by $SO_3H$, $NO_2$, $COOH$ groups or halogen, $R_2$ means a sulphonated benzene nucleus, $R_3$ means a benzene nucleus bearing as substituents a hydroxy and a carboxylic group in ortho position to each other and which may contain as further substituents a $CH_3$-group or halogen are made by combining a 1-amino-8-hydroxynaph-thalene-3,6-disulphonic acid first in an acid medium with a diazotized amino-compound of the type $R_1$—$NH_2$ and subsequently in an alkaline medium with a diazotized amino-azo-compound of the type $R_3$—N=N—$R_2$—$NH_2$, wherein $R_1$, $R_2$ and $R_3$ have the meanings above defined.

The dyestuffs obtainable in accordance with the invention yield in chrome printing on cotton green to blue-green shades having good fastness properties, in particular good fastness to chlorine. Correspondingly with their nature as polyazo-dyestuffs they can be discharged pure white by means of hydrosulphite. These dyestuffs represent a welcome extension of the range of dyestuffs for chrome printing on cotton.

The following examples illustrate the invention, the parts being by weight:

*Example 1*

The sparingly soluble diazo-compound made in the usual manner from 24 parts of sodium 4-nitraniline-2-sulphonate is filtered and the moist diazo body is stirred into a solution of 31.9 parts of 1-amino-8-naphthol-3,6-disulphonic acid and 5.5 parts of sodium carbonate in 250 parts of water. The temperature of the coupling mixture is maintained at 5–10° C. Coupling proceeds in a medium which is weakly acid owing to the mineral acid which adheres to the diazo body. When the reaction is finished the dyestuff is separated by salting out and pressed. The monoazo-dyestuff so obtained dissolves in water to a red-violet solution.

The amino-azo-compound 3-amino-4-sulpho-benzene-azo-salicylic acid is separately prepared in the usual manner by diazotizing 3-nitraniline-4-sulphonic acid, coupling with salicylic acid and reducing the nitro-group present in the mono-azo-compound by means of sodium sulphide. 33.7 parts of the amino-azo-compound thus prepared are diazotized in the form of a finely dispersed aqueous suspension at about 15° C. by means of 30 parts of hydrochloric acid and 6.9 parts of sodium nitrate, whilst stirring. The sparingly soluble diazo-compound is filtered and introduced whilst still moist into a solution of 54.8 parts of the mono-azo-dyestuff made as described in the first paragraph of this example in 400 parts of water. Coupling is brought about by adding 34 parts of magnesium carbonate and stirring the mass for 10–12 hours at 15° C. The mass is then acidified and the dyestuff is salted out, filtered and washed with water containing salt in order to remove magnesium salts. The precipitated dyestuff acid is dissolved by means of sodium carbonate and water and is again salted out, filtered and dried. The dyestuff so obtained is a dark powder soluble in water to a greenish-blue solution. In chrome printing on cotton it yields green shades of good fastness to soap and chlorine.

Instead of the 4-nitraniline-2-sulphonic acid used for the first coupling in this example there may be used, for instance, any of the following amino-compounds: 2 - nitraniline - 4 - sulphonic acid, 3-nitraniline-4-sulphonic acid, 4-nitraniline-3-sulphonic acid, para-nitraniline, 4-chloraniline-2-sulphonic acid, 4-chloraniline-3-sulphonic acid, sulphanilic- or metanilic acid, 2-chloro-4-nitraniline, 4-chloro-3-nitraniline, meta- or para-aminobenzoic acid and so on.

Instead of the 3-amino-4-sulphobenzene-azo-salicylic acid used for the last coupling there may be used, for instance, 4-amino-2-sulphobenzene-azo-salicylic acid, 4-amino-3-sulphobenzene-salicylic acid.

In all cases there are obtained dyestuffs which in respect of their fastness properties resemble that already described but yield shades which vary slightly towards yellow or towards blue.

*Example 2*

In a manner analogous to that described in Example 1 a mono-azo-dyestuff is made in a weakly acid medium from 21.8 parts of 2-nitraniline-4-sulphonic acid and 31.9 parts of 1-amino-8-naphthol-3,6-disulphonic acid. 54.8 parts of this dyestuff are combined in an alkaline medium according to the directions given in Example 1 with the diazo-compound from 33.7 parts of 3-amino-4-sulphobenzene-azo-salicylic acid.

The dyestuff so obtained dissolves in water to a greenish-blue solution and yields bluish-green shades in chrome printing.

In these examples there may be used for the preparation of the amino-azo-compound, for example 3-amino-4-sulphobenzene - azo - salicylic acid, instead of salicylic acid the homologues and analogues of this acid, such as cresotinic acids, chloro-salicylic acids and β-resorcylic acid, with similar results.

*Example 3*

A mono-azo-dyestuff is prepared from 20.8 parts of 4-chloraniline-2-sulphonic acid by diazotizing and subsequent coupling with 31.9 parts of 1-amino-8-hydroxynaphthalene-3,6 - disulphonic acid in a weakly acid medium in an analogous manner as is described in Example 1.

The mono-azo-body thus obtained is afterwards combined with the diazocompound from 35.1 parts of 3-amino-4-sulphobenzene-azo-ortho-cresotinic acid in an alkaline medium. (3-amino-4-sulphobenzene-azo-ortha-cresotinic acid is obtainable from diazotized 3-nitraniline-4-sulphonic acid by coupling with ortho-cresotinic acid and by reducing the nitro group).

The trisazodyestuff so obtained is soluble in water to a bluish-green solution and yields in printing with chrome mordant bluish-green shades.

What we claim is:—

1. A process for the manufacture of mordant trisazo-dyestuffs corresponding to the following general formula:

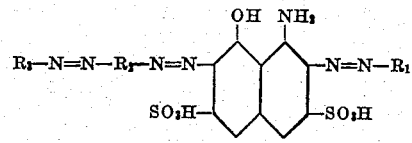

wherein R₁ means a benzene nucleus, R₂ a sulphonated benzene nucleus and R₃ a benzene nucleus, which must bear a hydroxy- and a carboxylic group in ortho position to each other, said process consisting in preparing a first diazo compound by diazotizing an amino compound of the type R₁—NH₂, further preparing a second diazo compound by diazotizing an amino-azo compound of the type R₃—N=N—R₂—NH₂, the latter being obtainable from a compound

by diazotizing and coupling with a compound R₃ and by reducing the nitro group to the amino group, wherein R₁, R₂, R₃ have the meanings above defined, coupling the first diazo compound in an acid medium with 1-amino-8-hydroxy-naphthalene-3,6-disulphonic acid, and finally coupling the thus formed azo compound in an alkaline medium with the second diazo compound.

2. A process for the manufacture of mordant trisazo-dyestuffs corresponding to the following general formula:

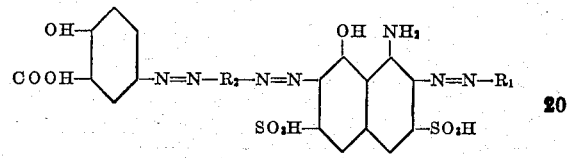

wherein R₁ means a benzene nucleus and R₂ a sulphonated benzene nucleus, said process consisting in preparing a first diazo compound by diazotizing an amino compound of the type R₁—NH₂, further preparing a second diazo compound by diazotizing an amino-azo compound of the type:

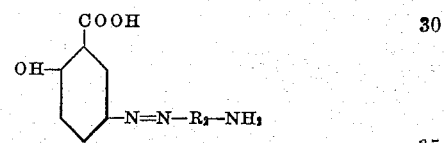

the latter being obtainable from a compound NH₂—R₂—NO₂ by diazotizing and coupling with salicylic acid and by reducing the nitro group to the amino group, wherein R₁ and R₂ have the above defined meanings, coupling the first diazo compound in an acid medium with 1-amino-8-hydroxy-naphthalene-3,6-disulphonic acid and finally coupling the thus formed azo compound in an alkaline medium with the second diazo compound.

3. A process for the manufacture of mordant trisazo-dyestuffs corresponding to the following general formula:

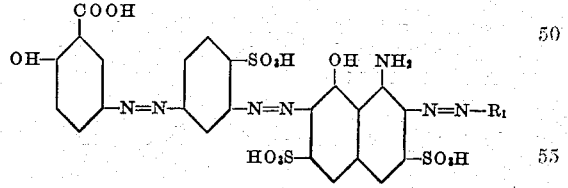

wherein R₁ means a benzene nucleus, said process consisting in preparing a first diazo compound by diazotizing an amino compound of the type R₁–NH₂, further preparing a second diazo compound by diazotizing the amino-azo compound of the following formula:

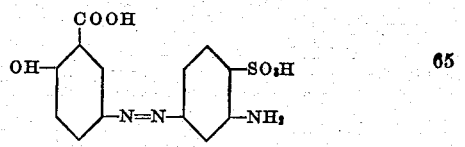

the latter being obtainable from 3-nitroaniline-4-sulphonic acid by diazotizing and coupling with salicylic acid and by reducing the nitro group to the amino group, wherein R₁ has the above defined meaning, coupling the first diazo compound in an acid medium with 1-amino-8-hydroxy-naphthalene-3,6-disulphonic acid and finally coupling the thus formed azo compound in an alkaline medium with the second diazo compound.

4. A process for the manufacture of mordant trisazo-dyestuffs corresponding to the following general formula:

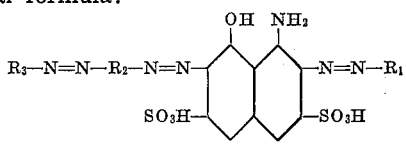

wherein $R_1$ means a nitrated and sulphonated benzene nucleus, $R_2$ a sulphonated benzene nucleus and $R_3$ a benzene nucleus, which must bear a hydroxy- and a carboxylic group in ortho position to each other, said process consisting in preparing a first diazo compound by diazotizing an amino compound of the type $R_1$—$NH_2$, further preparing a second diazo compound by diazotizing an amino-azo compound of the type $$R_3—N=N—R_2—NH_2,$$

the latter being obtainable from a compound $NH_2$—$R_2$—$NO_2$ by diazotizing and coupling with a compound $R_3$ and by reducing the nitro group to the amino group, wherein $R_1$, $R_2$, $R_3$ have the meanings above defined, coupling the first diazo compound in an acid medium with 1-amino-8-hydroxy-naphthalene-3,6-disulphonic acid, and finally coupling the thus formed azo compound in an alkaline medium with the second diazo compound.

5. A process for the manufacture of mordant trisazo-dyestuffs corresponding to the following general formula:

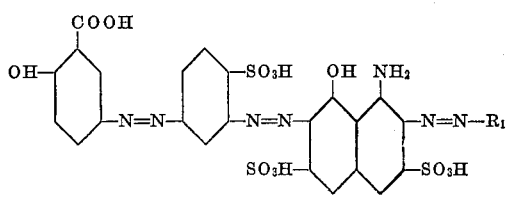

wherein $R_1$ means a nitrated and sulphonated benzene nucleus, said process consisting in preparing a first diazo compound by diazotizing an amino compound of the type $R_1$—$NH_2$, further preparing a second diazo compound by diazotizing the amino-azo compound of the following formula:

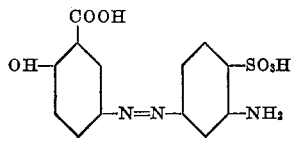

the latter being obtainable from 3-nitroaniline-4-sulphonic acid by diazotizing and coupling with salicylic acid and by reducing the nitro group to the amino group, wherein $R_1$ has the above defined meaning, coupling the first diazo compound in an acid medium with 1-amino-8-hydroxy-naphthalene-3,6-disulphonic acid, and finally coupling the thus formed azo compound in an alkaline medium with the second diazo compound.

6. A process for the manufacture of a mordant trisazo-dyestuff corresponding to the following formula:

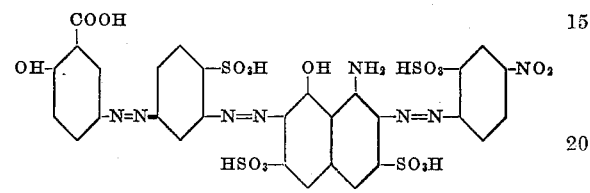

said process consisting in preparing a first diazo compound by diazotizing 4-nitroaniline-2-sulphonic acid, further preparing a second diazo compound by diazotizing the amino-azo compound obtainable from 3-nitroalinine-4-sulphonic acid by diazotizing and coupling with salicylic acid and reducing the nitro group to the amino group, coupling the first diazo compound in an acid medium with 1-amino-8-hydroxy-naphthalene-3,6-disulphonic acid, and finally coupling the thus formed azo compound in an alkaline medium with the second diazo compound.

7. The herein described trisazo-dyestuffs which correspond to the following general formula:

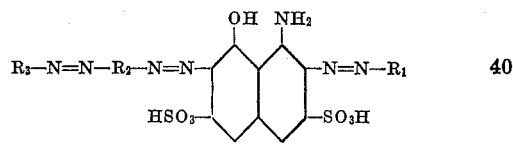

wherein $R_1$ means a benzene nucleus, $R_2$ a sulphonated benzene nucleus and $R_3$ a benzene nucleus, which must bear a hydroxy- and a carboxylic group in ortho position to each other, said dyestuffs forming dark powders, being in the form of their alkali salts easily soluble in water to blue to greenish-blue solutions and yielding in chrome printing green to blue-green shades of good fastness to soap and chlorine.

ERNST HUG.
MAX MÜLLER.